United States Patent [19]
Seki et al.

[11] Patent Number: 5,239,644
[45] Date of Patent: Aug. 24, 1993

[54] DATA PRELOADING METHOD AND SYSTEM FOR USING A BUFFER

[75] Inventors: Takaaki Seki, Takamatsu; Hiroyuki Kitajima; Tadashi Ohsone, both of Yokohama; Hirofumi Nakagawa, Hadano, all of Japan

[73] Assignee: Hitachi, Ltd., Tokyo, Japan

[21] Appl. No.: 758,231

[22] Filed: Sep. 9, 1991

Related U.S. Application Data

[63] Continuation of Ser. No. 329,028, Mar. 27, 1989, abandoned.

[30] Foreign Application Priority Data

Mar. 28, 1988 [JP] Japan .................................. 63-72072

[51] Int. Cl.$^5$ ............................................. G06F 13/14
[52] U.S. Cl. ...................... 395/425; 395/250; 395/275; 364/DIG. 1; 364/238.4; 364/239; 364/239.7; 364/243; 364/243.4; 364/243.41; 364/246; 364/260; 364/260.1; 364/263.1
[58] Field of Search .............. 395/425, 250, 600, 375, 395/275; 364/200 MS File, 900 MS File

[56] References Cited

PUBLICATIONS

Rowe, Lawrence., "A Shared Object Hierarchy," Proceedings of 1986 International Workshop on Object-Oriented Database Systems, IEEE Computer Society Press, 1986; pp. 160–170.

*Primary Examiner*—Paul V. Kulik
*Attorney, Agent, or Firm*—Fay, Sharpe, Beall, Fagan, Minnich & McKee

[57] ABSTRACT

A controller with a buffer is provided between a main memory and an external storage. This controller supplies a given request for access to the external storage and issues a preload request for a retrieval extent of the next access request by the time when data associated with this first access request is completely transferred to the buffer memory or to the main memory. Moreover, the controller stores the preloaded data in the buffer and, for the next access request, it transfers the data stored in the buffer to the main memory. Therefore, even when the host side (CPU) is processing, the access to the external storage can be made simultaneously, thus the response time and the operating ratio of the computer system being improved.

3 Claims, 10 Drawing Sheets

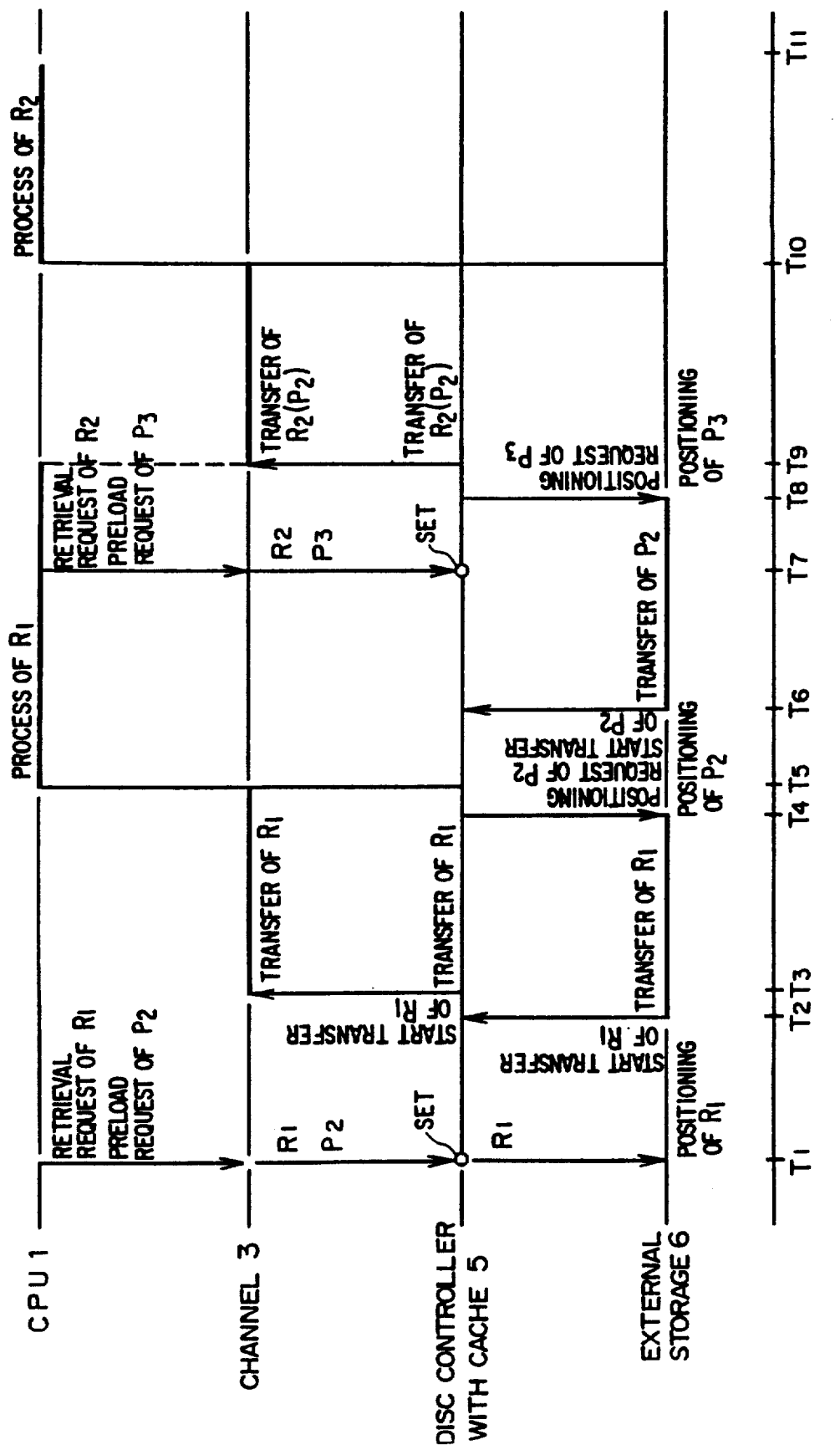

DATA PRELOADING METHOD AND SYSTEM FOR USING A BUFFER

This is a continuation of application Ser. No. 329,028, filed Mar. 27, 1989, abandoned.

BACKGROUND OF THE INVENTION

The present invention relates to a data transfer method for the access to a record on an external storage in a computer system connected with a disc controller with cache, or in a retrieval processing system connected with the controller and a retrieval processing device.

The preload-processed data of the record group to be subjected to access by use of a conventional disc controller with cache is described in the "NIKKEI ELECTRONICS" 3, 11 (1985), pages 159 to 232, particularly on page 170, titled "Disc. Cache and Semiconductor Disc Proved to have an Effect for Improvement in System Performance". In this paper, when an access request is issued from a CPU to a certain file, an examination is made of whether a desired data record is present in a disc cache. If the cache is hit, the desired data record is supplied from the cache to the main memory, and if the cache is missed, several blocks (normally, one-track length) including the desired record block to which access is now made are sequentially read from a magnetic disc in a cache memory (part of it is subjected to preloading).

SUMMARY OF THE INVENTION

Accordingly, it is an object of the present invention to provide a data transfer system having a controller with a buffer (disc controller with cache) of which the response time is reduced.

The conventional data transfer system has the drawback that when the disc controller with cache carries out preload processing on records, only several records (or several tracks) of the records to which access is to be made are sequentially inputted.

In general, it is desirable that the data processing device make full operation in order to improve the throughput of the whole system because the external storage such as the magnetic disc apparatus has a long processing time. In the prior art in which a constant amount of data, or several records or several tracks as described above are sequentially subjected to preload processing for each access request, however, satisfactory preloading processing is impossible under the sequential arrangement of access request. Therefor, the external storage comes to have a waiting time (idle) between access requests, which prevents the throughput of the system from being raised.

On the other hand, as shown in FIG. 3, an index access type computer system can be considered in which the retrieval extent can be found in advance by index or the like. In this case, the index is used to indicate the location at which data associated with each value for retrieval is stored on the external storage. In the computer system, by use of index it is possible to previously narrow down in the external storage the range of data associated with a value which the user specified and thereby to limit the retrieval extent. In this type of system, as shown in FIG. 3, each time an index address is issued, the corresponding block address is obtained by the indication of the index and access to the associated block is made. Thus, it is not possible to make preloading of the block which the index indicates, and hence it is necessary to make access to each block ($R'_i$ to $R'''_i$) on the external storage.

Thus, in order to achieve the above object, the present invention proposes such a data transfer method as described below. A controller with a buffer (cache memory) is provided between a main memory and an external storage, so that before the completion of the data transfer to the main memory associated with a given retrieval request $R_i$, a retrieval extent $D_{i+1}$ (or part thereof, $D'_{i+1}$) of the external storage to be retrived in accordance with the next retrieval request $R_{i+1}$ is specified and a preload request $P_{i+1}$ is issued (from the host side to the controller). The controller receives the retrieval request $R_i$ and the preload request $P_{i+1}$, and retrieves the retrieval extent $D_{i+1}$ (or part thereof, $D'_{i+1}$) on the external storage in accordance with the request $P_{i+1}$ before the next request $R_{i+1}$ is issued after the data transfer from the external storage associated with the request $R_i$. The retrieved data is temporarily stored in the buffer. Also, the controller, when the next retrieval request $R_{i+1}$ specifying the extent $D_{i+1}$ is issued, transfers the data ($D_{i+1}$ or part thereof, $D'_{i+1}$) stored in the buffer, to the main memory.

More specifically, the retrieval extent $D_{i+1}$ (or $D'_{i+1}$) specified by,the preload request $P_{i+1}$ is determined in units of blocks so that the waiting time of the external storage can be reduced to a minimum in consideration of the distance between the successive retrieval requests $R_i$ and $R_{i+1}$, the average processing time per block (record), and so on. After the data record associated with the request $R_i$ has been completely transferred from the external storage to the buffer or the CPU (main memory), the CPU processes the data record associated with the request $R_i$, and at the same time, the controller (disc controller or the like) continues the preload processing of the record (group) associated with the preload request $P_{i+1}$ from the external storage to the buffer. Then, the controller can respond to the retrieval request $R_{i+1}$ from the CPU to transfer the corresponding record on the buffer to the main memory. When all the retrieval extent $D_{i+1}$ associated with the request $R_{i+1}$ is not subjected to preload processing (or only part $D'_{i+1}$ is subjected to the preload processing), only the remaining portion ($D_{i+1} - D'_{i+1}$) is transferred from the external storage to the main memory.

The process request program which is executed on the computer system connected to the buffer (disc cache)-bearing controller establishes the retrieval request $R_i$ associated with the extent (record group) $D_i$ to be retrieved, and the preload request $P_{i+1}$ associated with the retrieval request of the next required retrieval extent (record group) $D_{i+1}$, and transfers them to the buffer-bearing controller. In this case, for example the retrieval extent $D_{i+1}$ is determined so that the waiting time of the external storage can be reduced to a minimum, in consideration of the distance between the successive retrieval requests $R_i$ and $R_{i+1}$ and the average processing time per block. The controller with buffer makes preload processing of the record (group) associated with the preload request and permits it to be supplied from the external storage to the buffer (cache memory). Thereafter, the host-side process request program issues the retrieval request $R_{i+1}$ to the controller with buffer. The controller with buffer responds to the request $R_{i+1}$ to transfer the request record on the buffer (cache memory) directly to the main memory, and transfer the record except on the buffer (cache memory) from the external storage to the main memory. The process request program, after the input of all the record (group) associated with the request $R_{i+1}$, similarly establishes the preload request $P_{i+2}$ associated with the next retrieval request $R_{i+2}$ and issues it to the controller with buffer. The above operations are repeated until the last record access request of the corresponding process request. Thus, for the process request, the preload access to the external storage can be carried out even during the CPU process. Therefore, the external storage has almost no waiting time, and the response time and the throughput of the whole system including the CPU and the external memory can be improved.

BRIEF DESCRIPTION OF THE DRAWINGS

FIGS. 4A and 4B are timing charts for the operations of the retrieval request issuing to the retrieval result receiving process according to the embodiment of the present invention.

DESCRIPTION OF THE PREFERRED EMBODIMENTS

Figure 1:
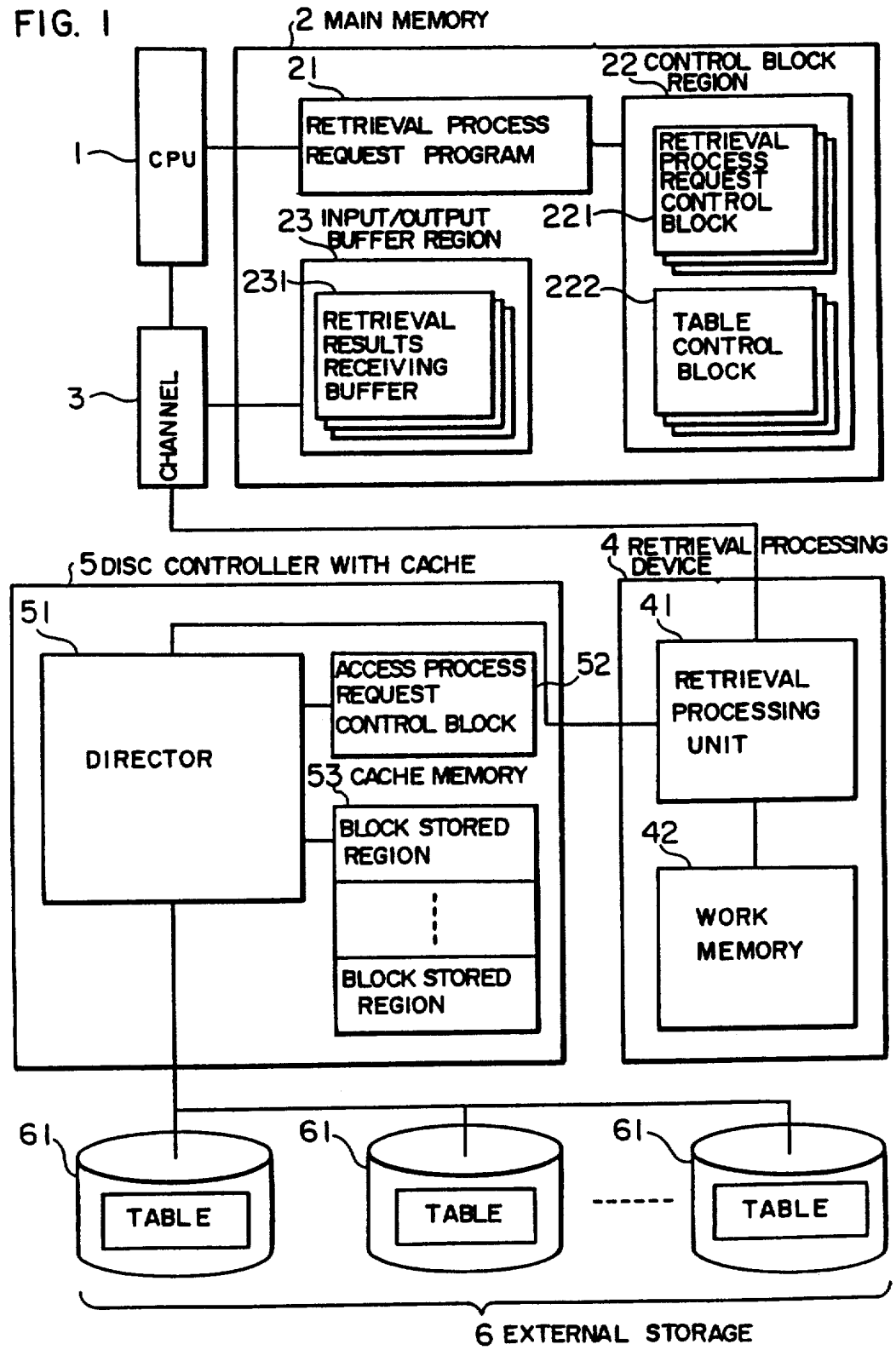
FIG. 1 is a block diagram of one embodiment of a data transfer system of the present invention.

Before one embodiment of the present invention is mentioned with reference to FIG. 1, the technical terms to be used in this embodiment will be explained below.

Table: a set of logical data as viewed from users, which is formed of a plurality of rows and a plurality of columns. The table is also sometimes called data base or file.

Retrieval processing: the comparing processing, arithmetic processing, selecting processing, partially cutting-out processing, and summing processing specified by the data base operation data which the retrieval processing device 4 issues to the blocks of the table 61 (through the disc controller with cache 5). This retrieval is also called data base operation.

Retrieval extent: the extent of blocks in the case when the retrieval processing device 4 makes data base operation on the blocks of the table (through the disc controller with cache 5).

Preload retrieval request: the block-preload request and the request for data base operation of preload-processed blocks which the CPU issues to the retrieval processing device 4.

Preload request: the request for the input of blocks within the external storage device 6 and for storing the input blocks on the cache memory which request is issued from the retrieval processing device 4 to the disc controller with cache 5.

Access request: the request for input of block which the retrieval processing device 4 issues to the disc controller with cache 5.

Access extent: the extent of blocks to which access is made when the retrieval processing device 4 issues an access (inputting a block) request to the disc controller with cache 5.

One embodiment of the present invention will hereinafter be described with reference to FIG. 1. There are shown a CPU (central processing unit) 1, a main memory 2, a retrieval program 21 for emboding the present invention, a control block area 22 necessary for executing the retrieval program 21 and an input/output buffer region 23. The control block region 22 is formed of a retrieval request control block 221 and a table control block 222. In the retrieval request control block 22 are stored access range information of retrieval conditions, access request table and retrieval processing request information including received buffer address of input record (hereinafter, in this embodiment, the record is referred to as the block, which is the unit size of read/-write data to an external storage 6, and one block may correspond to a plurality of records). In the table control block 222 are stored the device address and physical range address which specify where the table to which access is made exists within the external storage 6. The input/output buffer region 23 has a retrieval result receiving buffer 231 for storing the retrieval result from the retrieval processing device 4 or the block to be transferred from the disc controller with cache 5. Shown at 3 is a channel for controlling the data transfer between the CPU1 or the main memory 2 and the retrieval processing device 4. The retrieval processing device 4 receives the sub-retrieval request and preload retrieval request from the retrieval program 21 and makes retrieval processing of the table. The sub-retrieval request is the individual retrieval request issued by the host side (including the CPU1, main memory 2 and channel 3) when the retrieval processing of the table is performed according to a plurality of retrieval requests. The preload retrieval request is the request for the retrieval of the retrieval extent associated with the sub-retrieval request issued successively. The retrieval processing device 4 is formed of a retrieval processing unit 41 which accepts the sub-retrieval request from the retrieval program 21 and executes the retrieval processing, and a work memory 42 for storing information necessary for the retrieval processing. The retrieval processing unit 41 may be formed of an exclusive circuit, but here it is formed of a processor and makes processing according to a program which is preferably a microprogram.

The external storage 6 has stored therein an information table 61 for retrieval.

Figure 2:
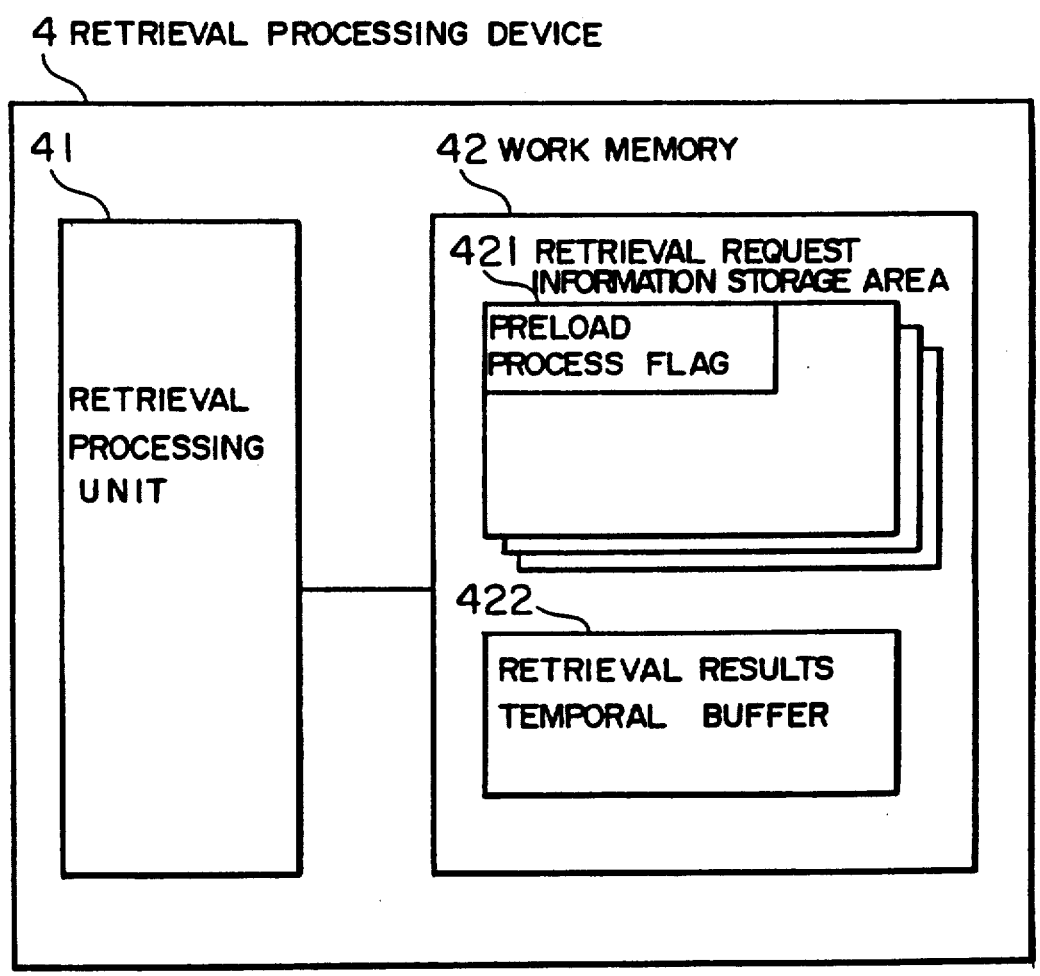
FIG. 2 shows in detail a retrieval processing unit and work memory of a retrieval processing device.

The disc controller with cache 5 carries out the following processes: (1) making access to information (table 61) to be retrieved on the external storage 6 and storing the accessed block in the cache memory 53; (2) transferring the blocks within the cache memory 53 toward the main memory 2; and (3) accepting the access request from the retrieval processing device 4 to the table 61 and storing the result of the access in the cache memory 53. FIG. 2 shows the details of the retrieval processing unit 41 and the work memory 42 of the retrieval processing device 4. The retrieval processing unit 41 accepts the sub-retrieval processing request and preload retrieval request from the retrieval program 21 and supplies the blocks being retrieved and the blocks being processed for preload retrieval in association with these requests to the retrieval processing device 4 where they are processed for retrieval. The work memory 42 has a retrieval request information storage area 421 for storing the sub-retrieval processing request and preload retrieval processing request from the retrieval program 21 and a retrieval results temporal buffer 422 for temporarily storing the results of retrieval processing within the retrieval processing device 4.

The disc controller with cache 5 has a director 51, an access request control block 52 and the cache memory 53. The director 51 makes access to the blocks of the table within the external storage 6. The access request control block 52 is the region for storing the block access request information from the host side or retrieval processing device 4. The cache memory 53 stores the input block associated with the file block within the external storage 6 and the retrieval results from the retrieval results temporal buffer 422 (temporarily storing the results of the retrieval processing within the retrieval processing device 4).

Figure 4B:
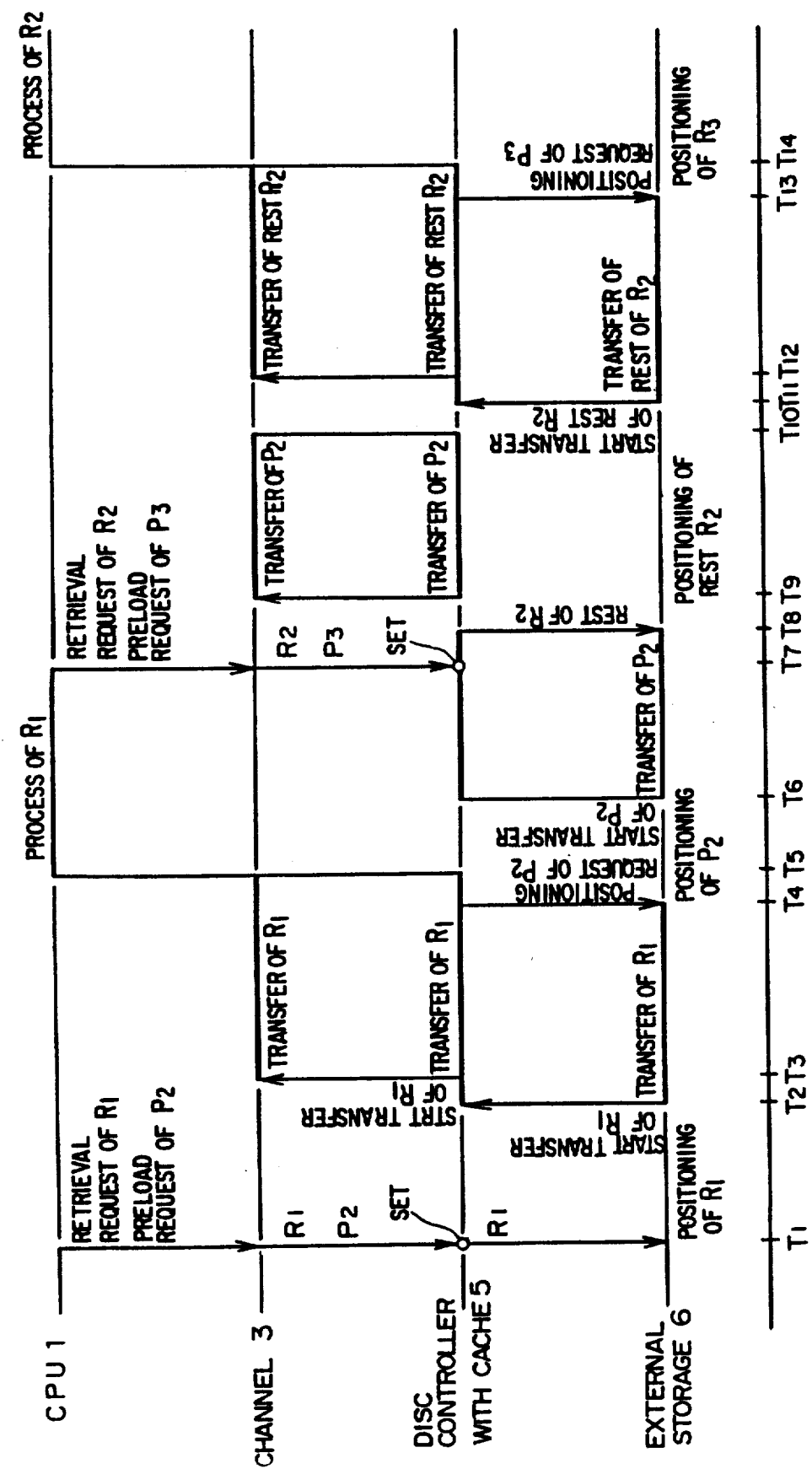

FIGS. 4A and 4B are timing charts in making access to the index so as to make the retrieval processing of blocks within the data base. These timing charts represent the flow of control of the CPU1 to the retrieval program 21, channel 3, disc controller with cache 5 (including the retrieval processing device 4) and external storage 6.

Figure 3:
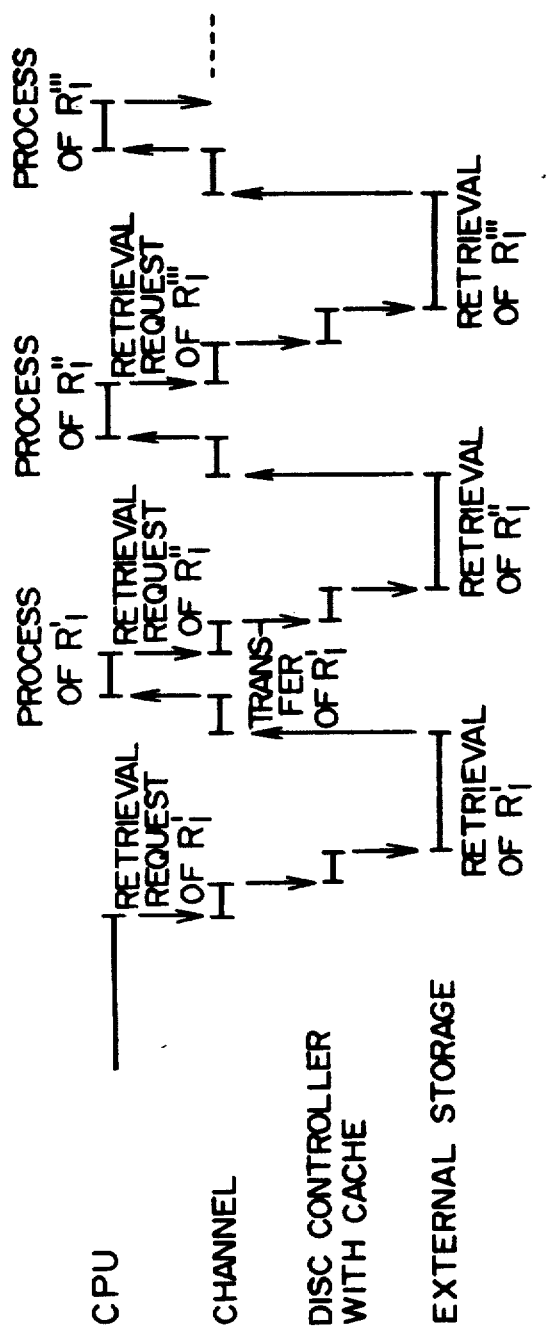
FIG. 3 is a timing chart for the operations of the retrieval request issuing to the retrieval result receiving process by the conventional data transfer system.

FIG. 3 is a timing chart in making access to the index so as to make retrieval processing of blocks within the data base. The comparison thereof will be described later.

Figure 5:
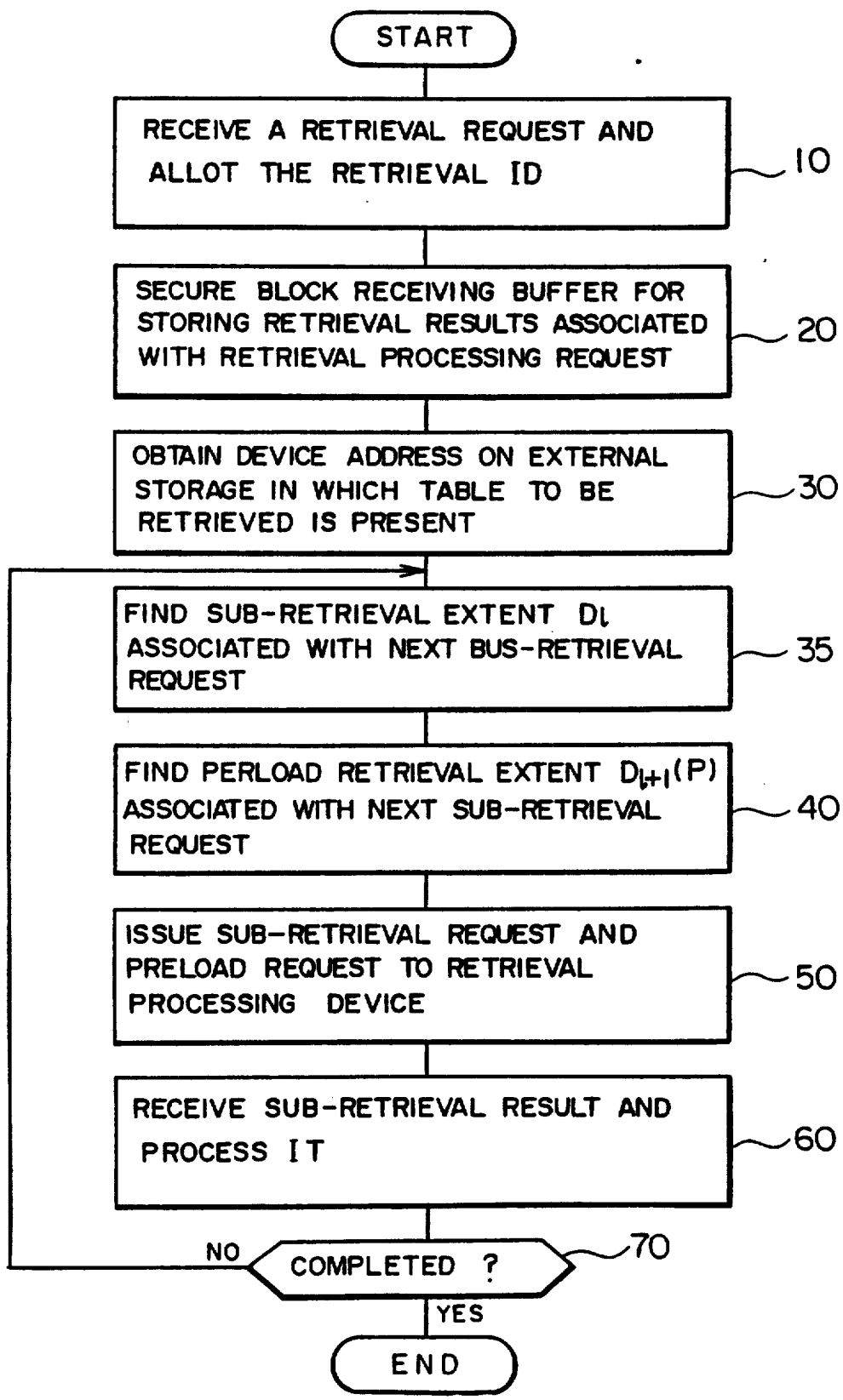
FIG. 5 is a general flow chart of the retrieval processing request program.

The operation of the one embodiment having such construction as mentioned above will be described below. First, with reference to FIG. 5, a description will be made of the processes of the retrieval program 21 in the CPU1. The user program (though not shown) to be executed by the CPU1 makes the retrieval (data base arithmetic operation) processing of the table and issues the retrieval processing request to provide the retrieval results against the retrieval program 21. The retrieval program 21 accepts the request. The retrieval program 21 receives the name of the table being retrieved, retrieval conditions and the address of the retrieval results receiving area as the contents of the retrieval processing request from the user program and storing them in a free retrieval request control block 221. In addition, it allots the retrieval ID associated with the retrieval processing request and stores it in the block 221 (step 10). The program also secures a free retrieval results receiving buffer 231 (step 20). Then, at steps 30 to 40, by using the name of the table being retrieved or the index, the sub-retrieval range $D_i$ is set which is associated with the i-th sub-retrieval request. First, searching is made on the table control block 222 to obtain the device address and extent information (start, end cylinder, track and block number where the table being retrieved is present) of the external storage 6 where the table being retrieved is present (step 30). From these are found the number of blocks being retrieved, which satisfy all the capacity of the secured retrieval results receiving buffer 231 and the sub-retrieval extent $D_i$ associated therewith (step 35). Also, the program finds the extent (addresses of blocks) being retrieved, on which the preload retrieval processing is to be made over several blocks (step 40). The extent being retrieved, found at step 40 is stored in the retrieval request control block 221 associated with the retrieval ID, as the retrieval extent $D_{i+1}(P)$ on which the preload processing is to be made. Here, the i-th retrieval request (counted from the host side) or the access request (from the retrieval processing device 4) is represented by $R_i$, and the associated retrieval extent by $D_i$. In addition, the preload retrieval request or preload operation associated with the retrieval extent $D'_{i+1}(P)$ which is to be subjected to preload processing and exceeds the retrieval extent $D_i$ is represented by $P_{i+1}$. The extent $D'_{i+1}(P)$ being subjected to the preload retrieval is set to such a necessary and sufficient extent that the preload operation $P_{i+1}$ (the positioning of the external storage 6 the $P_{i+1}$ and the transfer of the preload extent from the external storage 6 to the disc controller with cache 5 by the preload operation $P_{i+1}$) is not completed by the time when a certain access request $R_i$ ends and the next access request $R_{i+1}$ is issued. This is because the external storage 6 must be operated as at a high efficiency as possible. For the effective operation of the external storage 6, the following operations are carried out. A time $T_c$ from when the host side receives the retrieval results for the given sub-retrieval request $R_i$ until the host issues the next sub-retrieval request $R_{i+1}$ and an average time $T_b$ necessary for the retrieval processing device 4 to arithmetically process one block (from the access request for one block to data base operation and to storing the results in the preload flag retrieval results temporal buffer 422) are predicted and the quotient (raising to a unit) of $T_c$ to $T_b$ is estimated. This quotient is the number of blocks being subjected to preload retrieval, which can be processed within the time $T_c$. This quotient is defined as the preload extent $D'_{i+1}(P)$ associated with the sequentially issued sub-retrieval request. Thus, even during the time $T_c$ from when the host side receives the retrieval results for the arbitrary sub-retrieval request $R_i$ until the host side issues the next sub-retrieval request $R_{i+1}$, the data of the preload extent $D'_{i+1}(P)$ is retrieved from the external storage 6 on the basis of the preload request $P_{i+1}$ and therefore the external storage 6 can be effectively used. Moreover, when the successively issued sub-retrieval request $R_{i+1}$ is received by the retrieval processing device 4, the retrieval results associated with the retrieval request $R_{i+1}$ can be transferred to the host side immediately because the retrieval results of the extent associated with the retrieval request $R_{i+1}$ is already stored in the cache memory 53.

After setting this preload extent, the retrieval program 21 transfers the extent $D_i$ associated with the retrieval ID, retrieval conditions and sub-retrieval request, the extent $D'_{i+1}$ associated with the preload retrieval request and the address group of the retrieval result receiving buffer 231 associated with the sub-retrieval request to the retrieval processing device 4 as the retrieval processing information, requesting the retrieval processing on the blocks within the extent of the table (step 50). Thereafter, the retrieval program 21 waits until it is informed that the retrieval results are transferred from the retrieval processing device 4 and that the sub-retrieval processing request is finished (step 60). Until all the processes associated with the retrieval request are completed, steps 35 to 70 are repeated.

The operation of the retrieval processing device 4 will be described with reference to FIGS. 6, 7 and 8 which show a general processing flow of the retrieval processing device 4. This operation includes that the retrieval processing device 4 accepts the sub-retrieval processing request and the preload retrieval request, executes the retrieval processing by use of the disc controller with cache 5 and transfers the retrieval results to the retrieval receiving buffer 231 of the main memory 2.

The retrieval processing unit 41 of the retrieval processing device 4 checks if there is the retrieval request information storage area 421 which has stored therein the retrieval ID of one piece of the retrieval processing information of the accepted sub-retrieval processing request (step 200). If there is not, the free retrieval processing storage block 421 is secured and the retrieval processing information is stored in the block (step 210). The retrieval processing unit 41 supplies the extent $D_i$ associated with the sub-retrieval request and the extent $D'_{i+1}(P)$ associated with the preload retrieval to the disc controller with cache 5, requesting for the preload processing of the blocks of these extents from the disc (external storage) 6 to the cache memory 52 and for the input of one block of the extents (step 220). Then, the unit waits for the end of one block input from the disc controller with cache 5 (step 230).

Figure 9B:
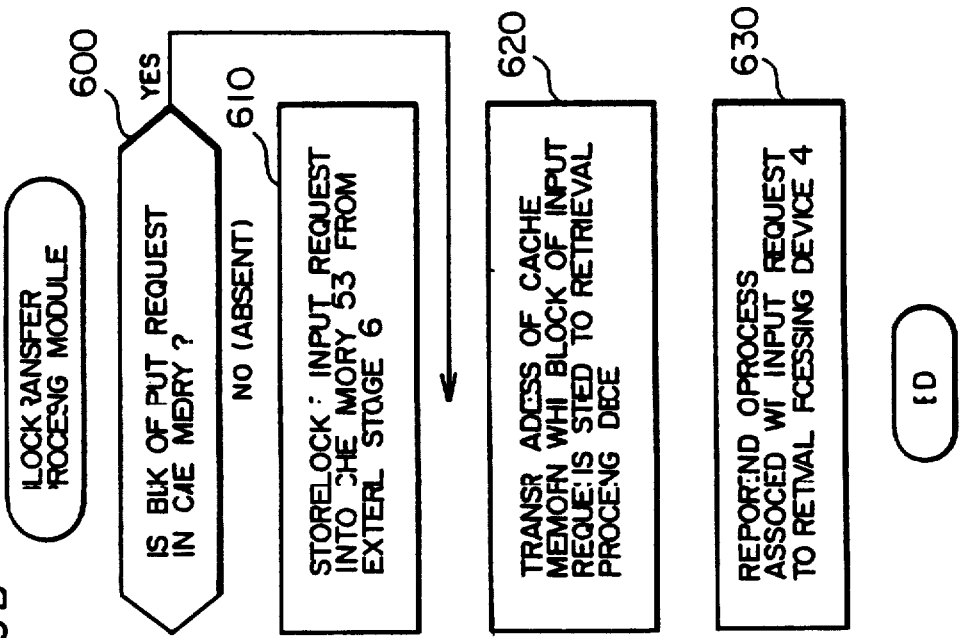
FIG. 9A and FIG. 9B are general flow charts of the program to be executed by the disc controller with cache.
Figure 9A:
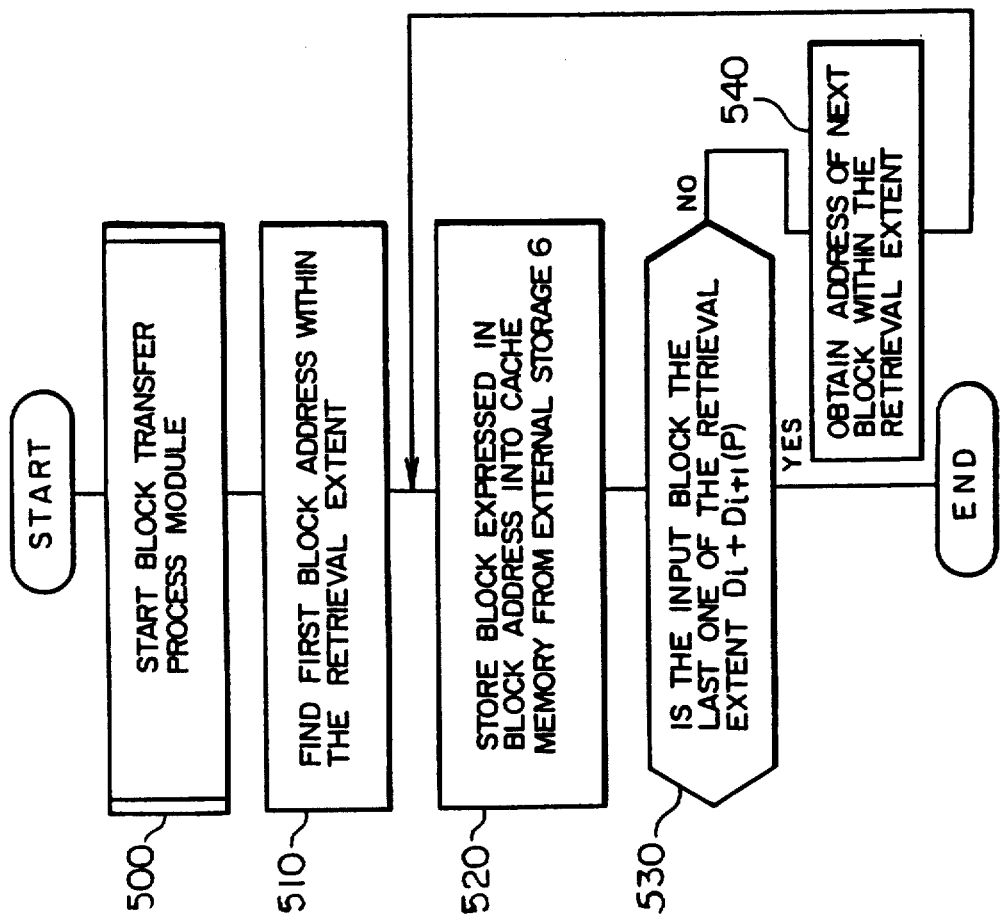

FIGS. 9A and 9B are general processing flow charts which are executed by the director 51 of the disc controller with cache 5. The director 51 accepts the request for input of the retrieval extent $D_i$ and preload extent $D'_{i+1}(P)$, and processes the input as shown in FIGS. 9A and 9B. The director 51 responds to the input of the accepted retrieval extent to actuate the block transfer processing module (the processing program within the director 51), thereby supplying the one block requested to input, to the retrieval processing device 4 (step 500). Then, it permits the successive blocks of the first to last block address of the accepted extent to be supplied from the external storage 6 into the cache memory 53 while the block transfer processing module is executed (step 510, 520). Then, it checks if the block supplied to the director 51 is the last block of the extent (step 530). If it is the last block, the processing is stopped. If it is not, the next block is received and the program goes back to step 520 (step 540). On the other hand, the actuated block transfer processing module (as shown in FIG. 9B) checks if the block of the specified block address is present within the cache memory 53 (step 600). If it is present, the address of the block present in the cache memory 53 is supplied to the retrieval processing device 4 (step 620). If it is not present, this block is supplied from the external storage 6 (step 610) into the cache memory 53, and the address of the block stored in the cache memory 53 is supplied to the retrieval processing device 4 (step 620). Thereafter, the retrieval processing device 4 is informed that the processing for the input of this block has been finished (step 630).

The retrieval processing device 4 is released from the stand-by mode when receiving the report of the completion of one block input from the disc controller with cache 5 (step 240). Moreover, the processing device makes retrieval processing of the block by use of the address of one block which is stored in the cache memory 53 from the controller 5, and stores the retrieval results in the retrieval results temporal buffer 422 (step 250). If the temporal buffer 422 is full of data (step 260), whether the preload retrieval processing requested is being performed or not (the block associated with the successively issued sub-retrieval request is being retrieved or not) is decided by use of the preload processing flag (see FIG. 2) within the retrieval request information storage area 421 associated with the retrieval ID (step 320). If the preload retrieval processing is not carried out (the preload retrieval processing flag is "0"), the retrieval results of the retrieval results temporal buffer 422 are transferred to the host side and stored in the block receiving buffer 231 (step 268).

Then, it is checked whether the retrieval results are transferred to all the retrieval results receiving buffer 231 group associated with the sub-retrieval request (step 270). If the results are transferred to all the buffer group, the host side is informed that the retrieval processing associated with the sub-retrieval request has ended (step 280). Then, it is decided whether the extent associated with the preload is present or not from the retrieval request information storage area 421. If it is not, the processing is stopped (step 290). If it is present, the preload flag is set to "on" (step 300). If there is the remaining free retrieval results receiving buffer 231 (step 270), the disc controller with cache 5 is requested to permit one block to be inputted into the next address of the sub-retrieval extent $D_i$ and this block is retrieved (step 310). If after step 280 the preload retrieval extent associated with the next issued sub-retrieval request is set, the disc controller with cache 5 is again requested to permit one block of the preload retrieval extent to be inputted as above (steps 240 to 310). If the last block of the retrieval extent is retrieved and there is no sub-retrieval request or new preload retrieval request for the next retrieval extent (step 335), the retrieval processing ends and the next sub-retrieval request is waited for. At step 320, if the preload retrieval processing is being carried out (the preload retrieval processing flag is "1"), the retrieval results from the retrieval results temporal buffer 422 are stored in the cache memory 53 of the disc controller with cache 5 (step 330) (in some case if there are many retrieval results temporal buffers 422, the retrieval results are held in the buffers 422 and are not stored in the cache memory 53 of the disc controller with cache 5).

Figure 6:
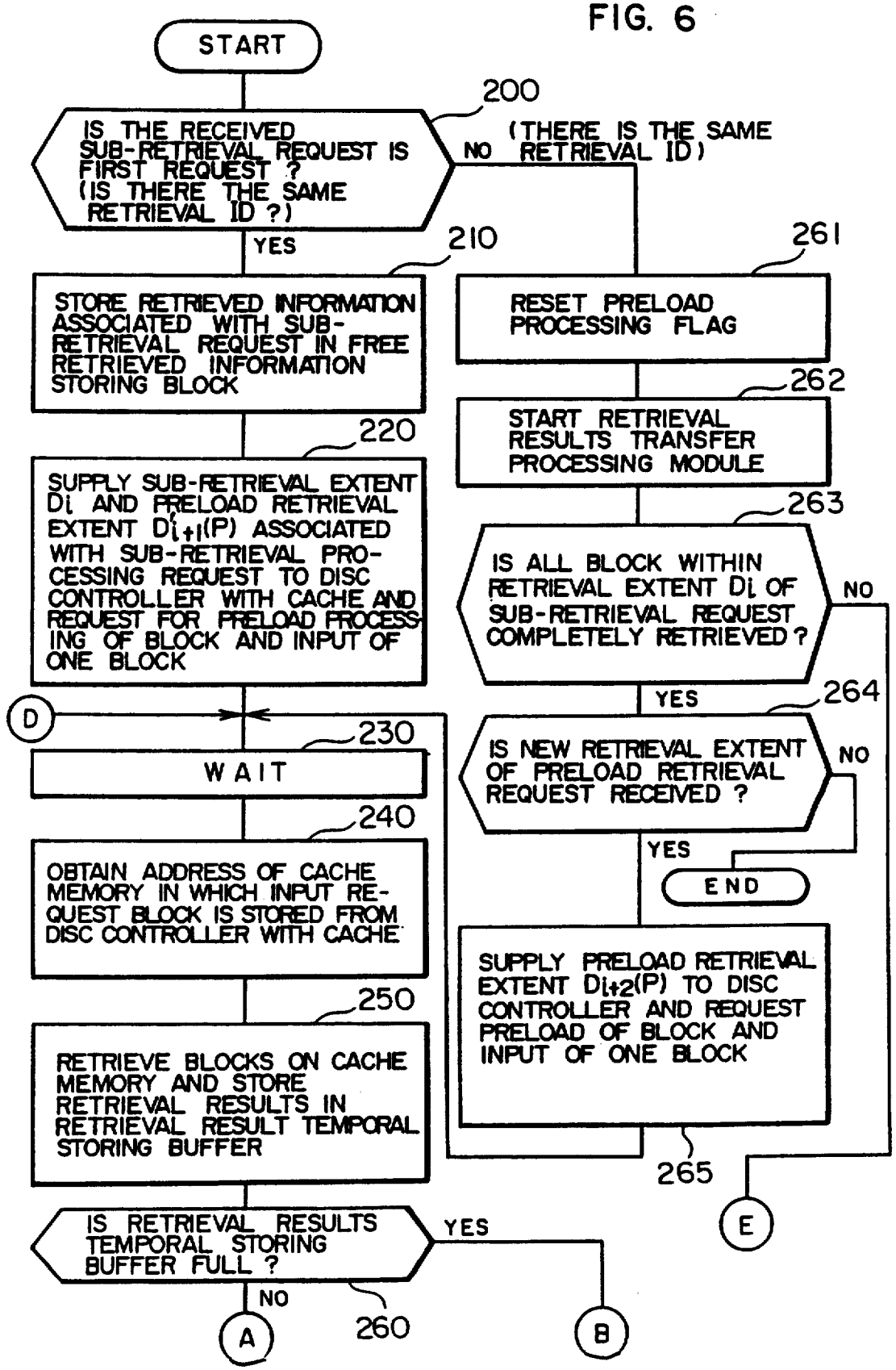
FIGS. 6, 7 and 8 are general flow charts of the program to be executed by the retrieval processing device 4.
Figure 7:
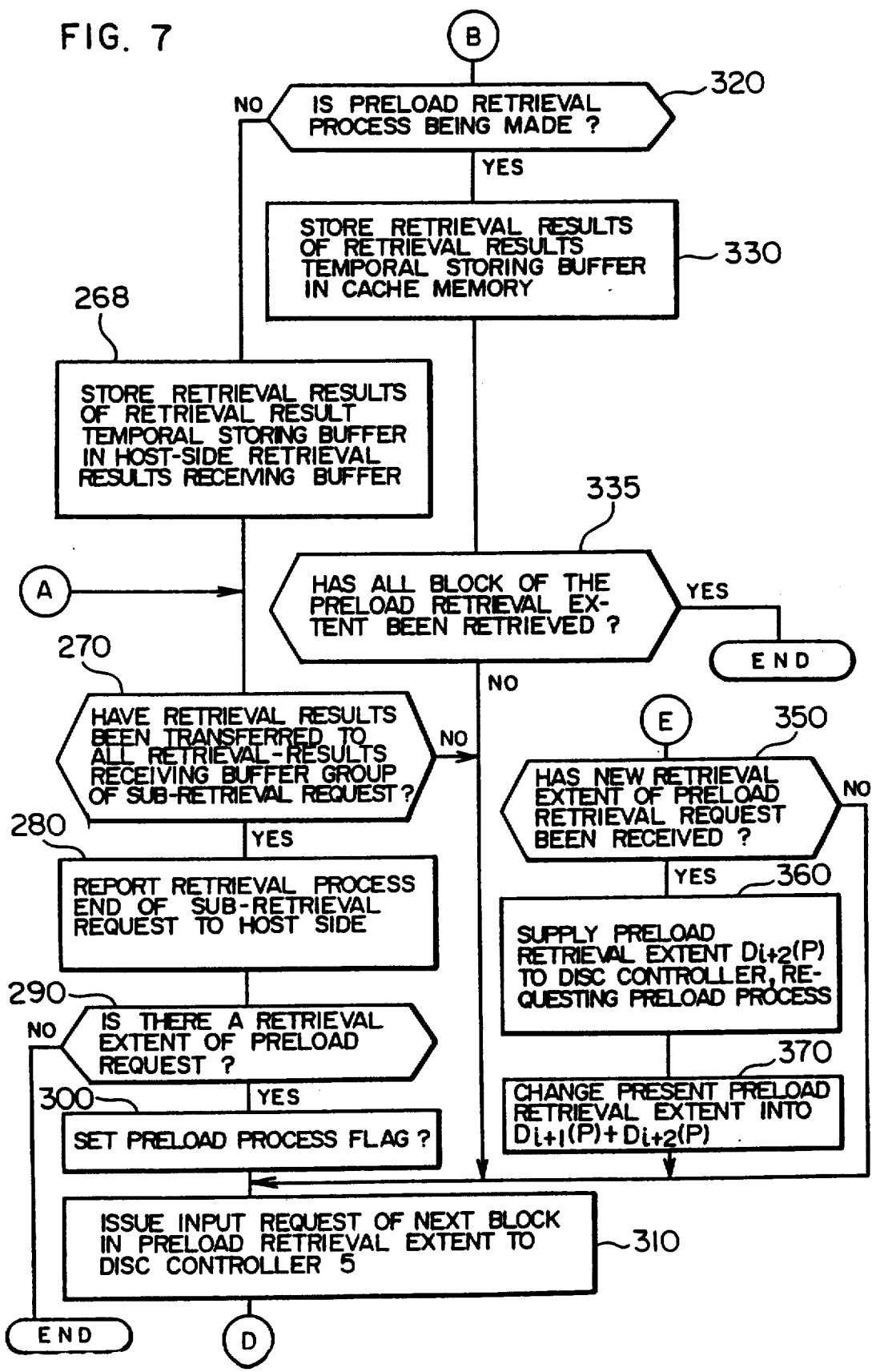

At step 200 in FIG. 6, if the sub-retrieval request $R_{i+1}$ successively issued from the host side retrieval processing request program 21 is supplied to the retrieval processing device 4 and there is the same ID, the preload retrieval processing flag (FIG. 2) is reset (step 261) and the retrieval results transfer processing module within the director 51 is actuated (step 262). The retrieval results transfer processing module (as described in detail later) transfers the retrieval results in the cache memory 53 of the disc controller with cache, associated with the sub-retrieval request. Together with this processing, it carries out a retrieval processing (data base operation) associated with a new, accepted sub-retrieval request. Also, decision is made of what part of the retrieval extent associated with the new accepted sub-retrieval request is being or has been subjected to preload retrieval processing (step 263). If after the decision all the blocks of the retrieval extent associated with the sub-retrieval request have been completely processed for preload retrieval, decision is again made of whether a new retrieval extent associated with preload retrieval has been accepted or not (step 264). If the decision is yes, the preload retrieval extent $D_{i+2}(P)$ is supplied to the disc controller with cache 5, and requested to undergo preload processing (step 265). Then, the above-mentioned preload retrieval processing is performed. If at step 264 the retrieval extent associated with preload retrieval is not received, the retrieval processing unit 41 ends its processing operation. If the preload retrieval processing is still progressing (step 263), and if a new retrieval extent associated with preload retrieval is received (step 350), the preload retrieval extent $D_{i+2}(P)$ is supplied to the disc controller with cache 5 and requested to undergo preload processing (step 360). Then, the present preload retrieval extent is extended to $D_{i+1}(P)+P_{i+2}(P)$ (step 370). If at step 350 the preload retrieval extent is not received, the program goes to step 310 where the block under preload retrieval processing is again requested to undergo cache preload and the processing continues.

Figure 8:
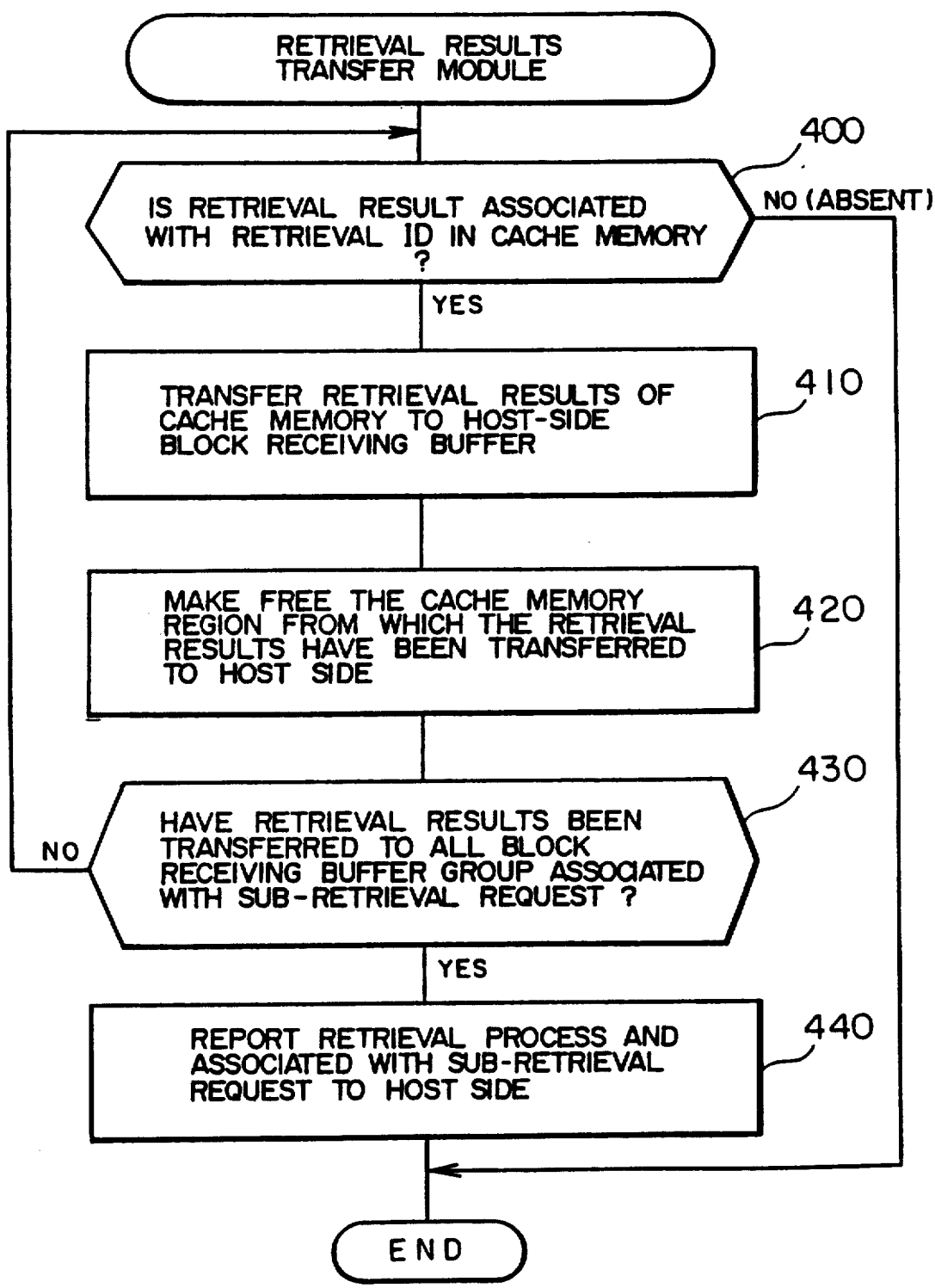

FIG. 8 is a flow chart of the retrieval results transfer processing module. The actuated retrieval results transfer processing module checks if the retrieval results associated with the sub-retrieval request, corresponding to the retrieval ID are present in the cache memory 53 of the disc controller with cache 5 (step 400). If present, the retrieval results in the cache memory 53 are transferred to the host side retrieval results receiving buffer 231 (step 410), and this region of the cache memory 53 is made free (step 420). If absent, the retrieval results transfer processing is stopped. This processing is performed until the results are transferred to all the retrieval results receiving buffer group 231 (step 430). If the results are transferred to all the buffers 231, the transfer processing of the results retrieved ends (step 440).

One embodiment of the preload retrieval processing using the retrieval processing device 4 and the disc controller with cache 5 has been mentioned as above. According to this embodiment, when a second or above sub-retrieval request of the same retrieval ID on the host side is issued, the retrieval results stored in the cache memory 53 of the disc controller with cache 5, in response to the preload sub-retrieval request, can be immediately transferred to the host-side main memory 2 without the necessity of new input, output operation to disc. Thus, the time from the issuing of a sub-retrieval request on the host side to the reception of the retrieval results can be decreased, resulting in the response time of retrieval processing being shortened.

To show the effect of the response time in the present invention, a description will be made of the conventional retrieval processing of blocks by index access again with reference to FIG. 3 and of the retrieval processing of blocks by index access according to the present invention with reference to FIG. 4 (in both figures, the processed portion by index access is not shown, and particularly in FIG. 4 the time taken for the access request (retrieval request) $R_i$ and the preload request $P_i$ to be supplied from the CPU1 to the external storage 6 is normally several ms or below which is negligible and thus not shown).

FIG. 4A shows the case of $D_i = D_f(P)$, or the case where the retrieval extent associated with the preload retrieval request $P_i$ is equal to the retrieval extent associated with the retrieval request $R_i$. FIG. 4B shows the case of $D_i > D_f(P)$, or the case where the retrieval extent associated with the preload retrieval request $P_i$ is narrower than that associated with the retrieval request $R_i$. In these figures the abscissa is the time.

The conventional index-access block-retrieval processing cannot make the preload processing of the block pointed by index because the block address is obtained for access to the block by one index access. As shown in FIG. 3, it is necessary to make access to the block on the external storage ($R'_1$ to $R'''_1$) for the retrieval request from the CPU. The processing time in FIGS. 4A and 4B are as follows.

In FIG. 4A, at time $T_1$ the retrieval request $R_1$ and the preload retrieval request $P_2$ are supplied from the CPU1 through the channel 3 and disc controller with cache 5 to the external storage 6. At this time, the retrieval request $R_1$ and the preload retrieval request $P_2$ are set in the disc controller with cache 5 and held therein until the processing for these requests is completed. At times $T_1$ to $T_2$, the positioning of the external storage 6 to the retrieval request $R_1$ is carried out. At times $T_2$ to $T_4$, the block associated with the retrieval request $R_1$ is transferred from the external storage 6 to the disc controller with cache 5. At times $T_3$ to $T_5$, the block associated with the retrieval request $R_1$ is transferred from the disc controller with cache 5 through the channel 3 to the CPU1 (main memory 2). At times $T_5$ to $T_7$ (or times $T_5$ to $T_9$), the block associated with the retrieval request $R_1$ is subjected to a predetermined processing by the CPU1. At time $T_4$ when the transfer of the block associated with the retrieval request $R_1$ from the external storage 6 to the disc controller with cache 5 is finished, the positioning request associated with the preload request $P_2$ is issued from the disc controller with cache 5 to the external storage 6. At times $T_4$ to $T_6$, the positioning of the external storage 6 is performed on the basis of the positioning request. At times $T_6$ to $T_8$, the block associated with the preload request $P_2$ is transferred from the external storage 6 to the disc controller with cache 5. At time $T_7$ during this interval, the retrieval request $R_2$ and the preload request $P_3$ are supplied from the CPU1 through the channel 3 to the disc controller with cache 5. At times $T_8$, the positioning request is issued from the disc controller with cache 5 to the external storage. At times $T_8$ to $T_{10}$, the external storage 6 carries out the positioning on the basis of the positioning request. At times $T_9$ to $T_{10}$ during this interval, the block associated with the preload request $P_2$, or the block associated with the retrieval request $R_2$ is transferred from the disc controller with cache 5 through the channel 3 to the CPU1. After time $T_{10}$, the CPU1 carries out a predetermined processing of the block associated with the retrieval request $R_2$.

The sequence at times $T_1$ to $T_8$ in FIG. 4B is the same as that at times $T_1$ to $T_8$ in FIG. 4A. However, since $D_i > D_f(P)$, at time $T_8$ the block associated with the preload request $P_2$ is transferred from the external storage 6 to the disc controller with cache 5. The block corresponding to the difference between the block associated with the retrieval request $R_2$ and the block associated with the preload request $P_2$, or to $D_i - D_f(P)$ is not transferred. Thus, the positioning request associated with the rest ($D_i - D_f(P)$) of the retrieval request $R_2$ is issued from the disc controller with cache 5 to the external storage 6. At times $T_8$ to $T_{11}$, the external storage 6 carries out the positioning for the positioning request. At times $T_9$ to $T_{10}$ of the interval, the disc controller with cache 5 transfers the block associated with the preload request $P_2$ through the channel 3 to the CPU1. The block associated with the rest of the retrieval request $R_2$ is transferred from the external storage 6 to the disc controller with cache 5. At times $T_{11}$ to $T_{13}$ and from the disc controller with cache 5 through the channel 3 to the CPU1 at times $T_{12}$ to $T_{14}$. After time $T_{14}$, the CPU1 performs a predetermined processing of the block associated with the retrieval request $R_2$. At time $T_{13}$, the disc controller with cache 5 issues a positioning request associated with the preload request $P_3$ to the external storage 6. The external storage 6 responds to this positioning request to carry out the positioning operation associated with the preload request $P_3$.

Thus, the retrieval processing of block by index access as shown in FIGS. 4A and 4B previously determines the addresses to the blocks associated with a plurality of index accesses and makes them the retrieval extent $D_i$ of the retrieval request $R_1$ (a set of $R'_i$ to $R_i^n$) and the preload retrieval extent $D_{i+1}(P)$. The retrieval request $R_i$ and the preload retrieval request $P_{i+1}$ associated with the successively issued retrieval request $R_{i+1}$ are supplied from the CPU1 through the channel 3 to the disc controller with cache 5. After all the blocks associated with the retrieval request $R_i$ are received by the CPU1, access to index is made, determining the block address group of the retrieval extent $D_{i+2}(P)$ associated with the next preload retrieval request $P_{i+2}$, and the next retrieval request $R_{i+1}$ and the preload retrieval request $P_{i+2}$ of the successively issued retrieval request $R_{i+2}$ are supplied through the channel to the disc controller with cache 5. The method according the present invention repeats the above operations, making the retrieval processing. Since in the disc controller with cache 5, the block access processing for the retrieval request $R_i$ and the preload processing for the successively issued retrieval request $R_{i+1}$ are carried out, the blocks associated with the second retrieval request $R_1$ and the following are previously subjected to preload processing into the cache memory, and thus they can be transferred from the cache memory directly to the CPU1. Therefore, the time from when the retrieval request is issued to when the first block associated with the retrieval request $R_n$ is received is the same as the time from when "the retrieval request $R_2$ and the preload retrieval request $P_3$" are issued to immediately before "the process $R_2$" as described with reference to FIG. 4. Thus, as compared with the block retrieval processing method by index access shown in FIG. 3, the access time to the block pointed by index is shorted by an amount of (disc access time—cache memory access time).

In the above embodiment, since before the data associated with arbitrary retrieval request $R_i$ is completely transferred from the external storage, the preload request $P_{i+1}$ associated with the next retrieval request $R_{i+1}$ is issued, the access to the cache memory from the external storage associated with the retrieval request $R_i$ can be started or the access to the external storage associated with the preload request $P_{i+1}$ can be started immediately after the data transfer to the main memory is completed, or without useless time. To this end, a plurality of logical device addresses are provided for a plurality of external storages, whereby the access request $R_i$ to a given external storage is issued to the logical device corresponding to the external storage and the preload request $P_{i+1}$ associated with this external storage is issued to another logical device of this external storage.

According to this embodiment, the host side (host computer) supplies the sub-retrieval extent $D_i$ associated with the sub-retrieval request and the preload retrieval extent P associated with the successively issued sub-retrieval request to the retrieval processing device. Thus, the retrieval processing apparatus, after the retrieval processing of this sub-retrieval request or together with the processing, makes retrieval processing of the sub-retrieval extent associated with the successively issued sub-retrieval request. The retrieval results can be stored in the cache memory 53 of the disc controller 5. After the second sub-retrieval request is issued from the host side, the retrieval results stored in the cache memory 53 of the disc controller with cache 5 are immediately transferred to the main memory of the host side. Therefore, the time from when the sub-retrieval request is issued to when the retrieval results are received can be reduced, resulting in high-speed retrieval processing. In addition, the waiting time of the whole system including the CPU and the external storage can be reduced, thus leading to a high operating ratio.

As described in detail, according to the data transfer method of the present invention, by the time when the retrieval request $R_i$ and the data associated with this retrieval request $R_i$ are completely transferred to the buffer memory or the main memory, the host side specifies the retrieval extent $D_{i+1}$ associated with the next retrieval request $R_{i+1}$ (or part $D'_{i+1}$ thereof) and issues the preload request $P_{i+1}$. Moreover, the data read in response to the preload request $P_{i+1}$ is previously stored in the buffer memory. When the next retrieval request $R_{i+1}$ is issued, the data stored in the buffer memory is transferred to the main memory. Therefore, while the host side (CPU) is processing, it can make preload access to the external storage, thus the response time being reduced.

We claim:

1. A data transfer method using a controller with a buffer, a processing device and an external storage device which is connected to said controller, said controller making control operations comprising the steps of:
    (a) receiving from said processing device a read request Ri to read said external storage device and a preload request Pi+1 which specifies a non-successive extent of said external storage device to be preloaded to said buffer, associated with a read request Ri+1 which is to be next received by the external storage device from said processing device after said read request Ri,
    wherein when the preload extent of said preload request Pi+1 is part of a reading extent of said preload request Ri+1, the method comprising the sub steps of:
        (a1) subtracting the preloading extent of said preload request Pi+1 from the extent of said next read request Ri+1 to form a remaining extent, letting the remaining extent be the extent of next remaining read request Qi+1 for reading the part of Ri+1 which is not included in Pi+1 and supplying said next remaining read request Qi+1 from said controller to said external storage device,
        (a2) reserving said buffer to supply the preload data to said processing device associated with said next remaining read request Qi+1,
        (a3) supplying said next remaining read request Qi+1 to said external storage device,
        (a4) receiving data in the remaining extent associated with said next remaining read request Qi+1 from said external storage device; and,
        (a5) supplying the preload data in the remaining extent associated with Qi+1 to said processing device;
    (b) supplying said read request Ri to said external storage device;
    (c) receiving request data from said external storage device associated with said read request Ri;
    (d) supplying the request data to said processing device associated with said read request Ri;

(e) reserving said buffer to retrieve preload data associated with said preload request $Pi+1$ for supplying to said processing device;
(f) supplying said preload request $Pi+1$ to said external storage device;
(g) receiving the preload data from said external storage device;
(h) storing the preload data in said buffer;
(i) receiving said next read request $Ri+1$ from said processing device; and
(j) supplying the preload data stored in said buffer to said processing device in response to said next read request $Ri+1$ received from said processing device.

2. The data transfer method according to claim 1, wherein said external storage device is provided with a plurality of logical addresses for said processing device to access exclusively, said step (b) supplies said read request to a one of said plurality of logical addresses, and said step (1) supplies said preload request to a selected one of said plurality of logical addresses.

3. A data transfer method using a controller with a buffer, a processing device and an external storage device which is connected to said controller, said controller making control operations comprising the steps of:
(a) receiving from said processing device a read request $Ri$ to read said external storage device and a preload request $Pi+1$ which specifies a non-successive extent of said external storage device to be preloaded to said buffer, associated with a read request $Ri+1$ which is to be next received by the external storage device from said processing device after said read request $Ri$;
(b) supplying said read request $Ri$ to said external storage device;
(c) receiving request data from said external storage device associated with said read request $Ri$;
(d) supplying the request data to said processing device associated with said read request $Ri$;
(e) receiving said buffer to retrieve preload data associated with said preload request $Pi+1$ for supplying to said processing device;
(f) supplying said preload request $Pi+1$ to said external storage device;
(g) receiving the preload data from said external storage device;
(h) storing the preload data in said buffer;
(i) receiving said next read request $Ri+1$ from said processing storage device; and,
(j) supplying the preload data stored in said buffer to said processing device in response to said next read request $Ri+1$ received from said processing device, wherein said step (i) is carried out before said steps (g) and (h) are completed.

* * * * *

UNITED STATES PATENT AND TRADEMARK OFFICE
CERTIFICATE OF CORRECTION

PATENT NO. : 5,239,644

DATED : August 24, 1993

INVENTOR(S) : Takaaki Seki, et al.

It is certified that error appears in the above-identified patent and that said Letters Patent is hereby corrected as shown below:

Claim 1, column 12, line 39, delete "preload" and substitute therefor --next read--.

Claim 3, column 14, line 12, delete "receiving" and substitute therefor --reserving--.

Signed and Sealed this

Fifteenth Day of March, 1994

*Attest:*

BRUCE LEHMAN

*Attesting Officer*     Commissioner of Patents and Trademarks